United States Patent
Mazzei

(10) Patent No.: US 7,040,839 B1
(45) Date of Patent: May 9, 2006

(54) SUBSURFACE IRRIGATION OF PLANTS, TREES AND LANDSCAPE WITH WATER CONTAINING GAS MICRO-BUBBLES

(76) Inventor: Angelo L. Mazzei, 11101 Mountain View Rd., Bakersfield, CA (US) 93307

( * ) Notice: Subject to any disclaimer, the term of this patent is extended or adjusted under 35 U.S.C. 154(b) by 0 days.

(21) Appl. No.: 11/137,144

(22) Filed: May 24, 2005

(51) Int. Cl.
*A01G 25/00* (2006.01)

(52) U.S. Cl. .......................... 405/45; 405/43; 405/44; 405/47; 405/51

(58) Field of Classification Search ............ 405/43–49, 405/51
See application file for complete search history.

(56) References Cited

U.S. PATENT DOCUMENTS

| | | | | |
|---|---|---|---|---|
| 965,895 | A | * | 8/1910 | Hardin ..................... 405/45 |
| 1,989,427 | A | * | 1/1935 | Robey ..................... 405/45 |
| 3,302,408 | A | * | 2/1967 | Schmid .................... 405/44 |
| 3,757,469 | A | * | 9/1973 | Smith et al. ............... 405/43 |
| 3,917,166 | A | * | 11/1975 | Hildebrandt et al. ......... 405/51 |
| 3,917,174 | A | * | 11/1975 | Hildebrandt et al. ......... 405/44 |
| 4,930,934 | A | * | 6/1990 | Adkins .................... 405/45 |
| 5,192,027 | A | * | 3/1993 | Delmer et al. ............. 405/45 |
| 6,173,526 | B1 | * | 1/2001 | Mazzei .................... 47/48.5 |
| 6,290,429 | B1 | * | 9/2001 | Presby .................... 405/45 |
| 6,890,126 | B1 | * | 5/2005 | Mazzei .................... 405/44 |
| 6,959,882 | B1 | * | 11/2005 | Potts ..................... 239/542 |

* cited by examiner

Primary Examiner—Frederick L. Lagman
(74) Attorney, Agent, or Firm—Donald D. Mon

(57) ABSTRACT

In the subsurface irrigation of crops, using injectors to provide micro-bubbles of useful gases of improvement of delivery of a more uniform stream with lesser variation in gas content and lesser tendency of particulate fines to settle out, thereby reducing the need to flush the system with attendant waste of water.

21 Claims, 2 Drawing Sheets

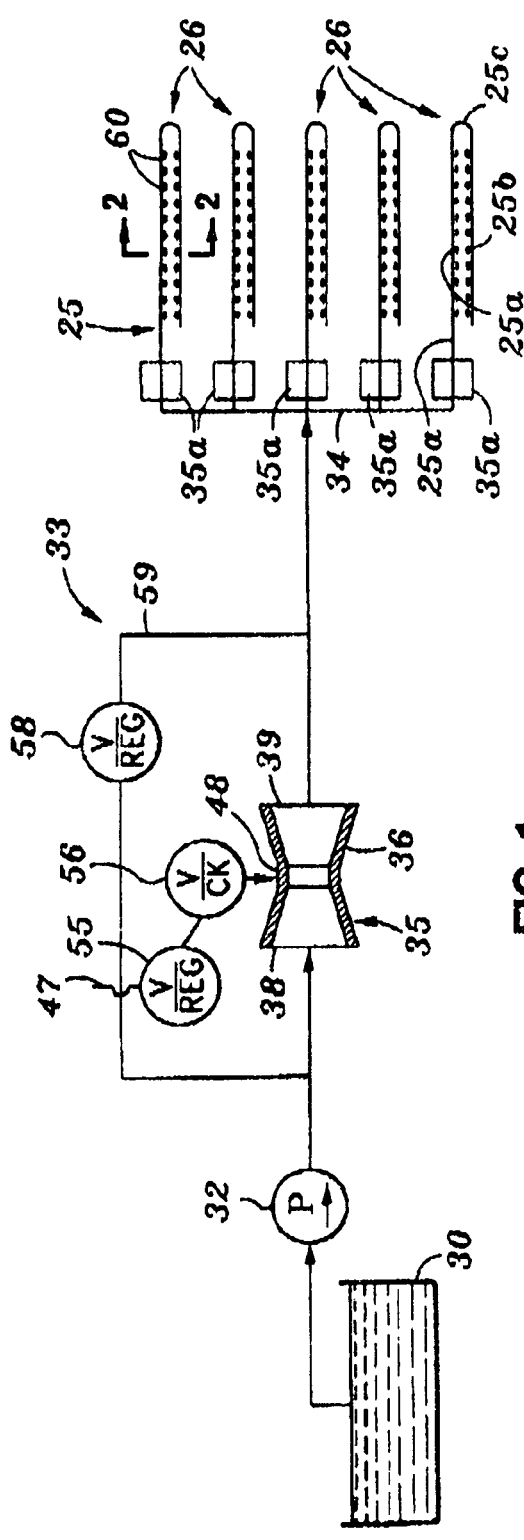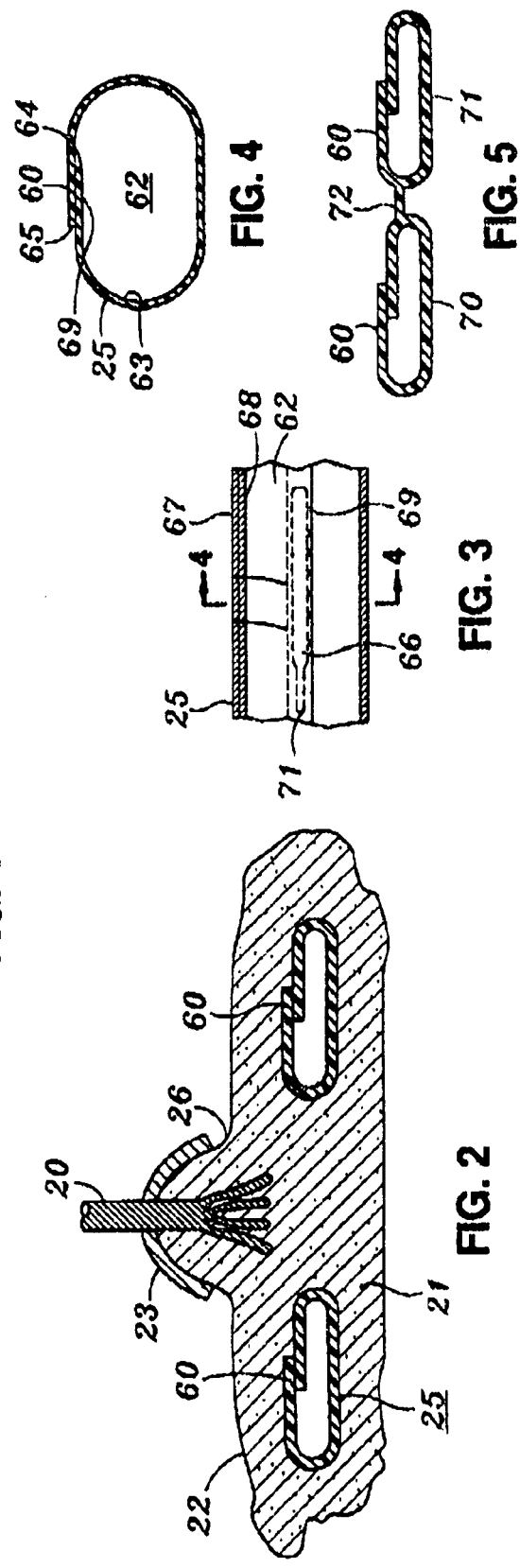

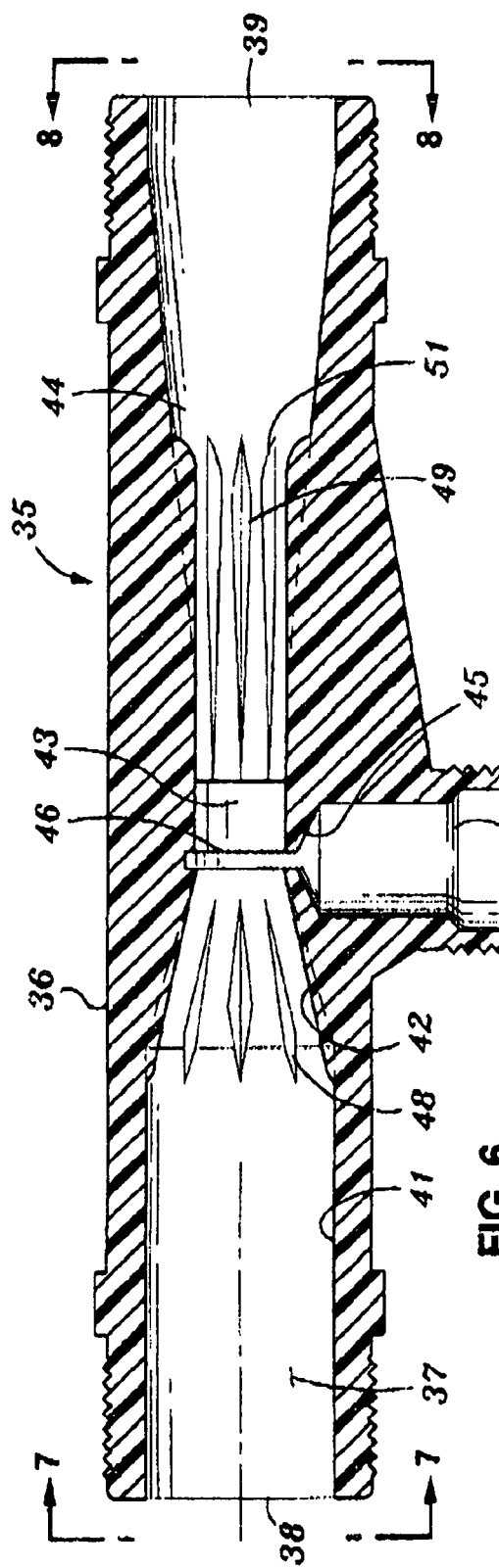
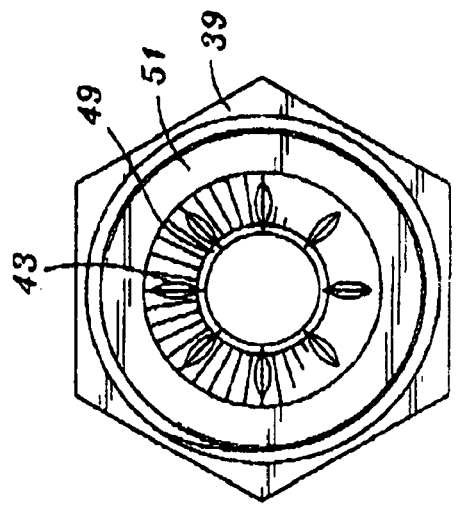
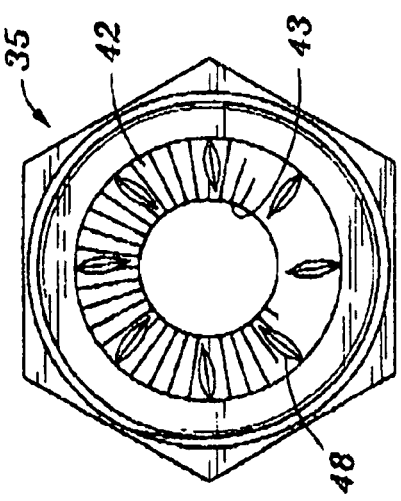

SUBSURFACE IRRIGATION OF PLANTS, TREES AND LANDSCAPE WITH WATER CONTAINING GAS MICRO-BUBBLES

FIELD OF THE INVENTION

Subsurface irrigation of plants, trees and landscape with water containing gas suspended as micro-bubbles. The gas may be useful for nourishment of growing plants, trees, and landscape, or for treatment of the soil.

BACKGROUND OF THE INVENTION

Subsurface irrigation of crops with water that contains dissolved oxygen and also micro-bubbles of air infused into the water by a mixer-injector, is shown in U.S. Pat. No. 6,173,526, issued to Angelo L. Mazzei, the inventor herein, on Jan. 16, 2001.

It is fundamental to growth of rooted plants, trees, and landscape that the roots have both water and oxygen. The customary source of oxygen is from air. Conventional growing procedures apply water to the surface of the ground. The water has some dissolved oxygen in it that is carried to the roots. This is usually insufficient, so the ground is permitted to dry in order to admit air into its structure which will be carried to the roots by the next irrigation or watering. This is a cyclic operation, and a farmer's profitability depends heavily on his applying enough water and air to accomplish this objective.

Too much water can literally drown the crop. Too little results in crop wilt and failure, or at least reduction in quality and production. Wastage of water is increasingly objectionable and expensive as water supply as a resource is diminished.

The system and process described in the said Mazzei patent improves the situation by supplying oxygen (usually from air) directly to the root zone without depending on seepage of water from the surface of the ground. Instead, water containing oxygen initially at a super-atmospheric pressure, and also air carried in micro-bubbles generated by passing the water through a mixer-injector, produces a surprisingly stable stream of water. Very small gas bubbles are injected into the soil along with the oxygen dissolved in the water.

This stream passes through a subsurface conduit. This conduit, often a drip irrigation tape or tube, ("tube" herein) is buried in the ground. In characteristic installations, this conduit extends for many yards, often along rows of crops such as strawberries and peppers. They discharge the water with its dissolved gases, and also with the entrained micro-bubbles of gas, usually air. Thus, both water in a correct amount and gas in a correct amount are released in the root zone where needed, and it is not necessary to flood the surface with its attendant evaporation and run-off wastage and other complications.

The system shown in the Mazzei patent has been in successful operation, producing significant increases in crop yield and quality. In some instances it has accelerated the maturity of the crop, enabling the grower to supply the early market. The early market commands a premium price.

It is customary to run an agricultural or landscape drip irrigation system to provide a reasonably filtered water and air (and additives if used), to supply the most troublesome parts of a field area. If some area shows problems of wilt, for example, the supply of the entire system is increased to be certain that all areas are sufficiently supplied. This means an oversupply to the regions which already would have had enough.

It is an object of this invention to improve the Mazzei system by providing for a more uniform distribution over the entire length of the conduitry, and to enable the discharge to occur in regions appropriate to the plants located there.

The micro-bubbles of gas are carried as a suspension in a flowing stream, and while the stream is flowing, there is some tendency for the gas to separate or coalesce, or for the fine unfiltered particles ("fines" herein) that may have passed through the filter to settle out. Reduced to absurdity, a stagnant stream would soon permit the mixed entrained air to coalesce, where it could cause uneven distribution or worse, result in a discharge as a flow of gas which will channel to the surface without diffusing along with the water. If the fines settle out in the tube, the tube must be flushed out periodically with water that will be wasted. The advantages of the gas are then mostly lost.

However stable the stream is, there will be a greater tendency for air to separate when the volume of micro-bubbles is highest. There is a tendency for air to be present in larger amounts upstream than downstream.

It is an object of this invention to provide conduitry in which the gas discharge "averages out" over the length of a plot.

It is another object of this invention to provide conduitry in a conveniently manufactured structure, and to provide for selective location of the related emitters and parts of the conduitry.

It is yet another feature of the invention to provide the micro-bubbles in a manner local to specific regions, rather than in a header where coalescing is likelier to occur.

It is another object of the invention to provide gases with other advantageous features such as fumigation.

BRIEF DESCRIPTION OF THE INVENTION

This invention is an improvement on the system shown in Mazzei U.S. Pat. No. 6,173,526. It is a drip irrigation system supplying water under pressure to subsurface soil near the plants. Until the water is released from the subsurface conduit it remains under system pressure. Before entering the conduit it has passed through a mixer-injector which introduces micro-bubbles of gas, usually air, into the entering stream but instead can be other treatment gases such as ozone or fumigants and mixture of various gases. From the mixer injector the stream flows into the conduit, which is provided with emitters along its length. The stream exits through the emitters, the water carrying gases dissolved in it, and also carrying entrained micro-bubbles. This is the basic Mazzei system, for which this invention is an improvement.

According to this invention the conduitry is laid in a path to discharge these fluids in appropriate locations, which may be near individual plants, bushes or trees, or may be placed along a row so as to supply fluid all along the path. This conduit has a first, forward length, and a second, return length. These lengths are fluidly joined at their farthest reach from the mixer injector. With such an arrangement, the difference in discharge along the lengths is averaged out when the lengths are oppositely directed but are sensibly near to each other.

These lengths may be separate conduits, or they may be a single conduit bent at the far end to form a U-shaped tube.

According to yet another preferred but optional feature of the invention, the emitters may be spaced at staggered or aligned locations along their length further to average out the supply.

According to yet another optional object of the invention, when the conduits are provided as joined companions, they may be locally separated to straddle a selected region while still enjoying the benefits of the invention over the remainder of the lengths.

According to yet another optional feature of this invention, a separate injector may be provided for each conduit.

The above and other features of this invention will be fully understood from the following detailed description and the accompanying drawings, in which:

BRIEF DESCRIPTION OF THE DRAWINGS

FIG. 1 is a schematic layout of a system according to the invention;

FIG. 2 is a cross-section taken at line 2—2 in FIG. 1;

FIG. 3 is a longitudinal section of a length of tube in FIG. 1;

FIG. 4 is a cross-section taken at line 4—4 in FIG. 3;

FIG. 5 is a cross-section of another embodiment tube useful with this invention;

FIG. 6 is a cross-section of a presently preferred mixer-injector;

FIG. 7 is a left hand end view taken at line 7—7 in FIG. 6; and

FIG. 8 is a right hand end view taken at line 8—8 in FIG. 6.

DETAILED DESCRIPTION OF THE INVENTION

The object of this invention is to provide a supply of water and oxygen and/or other potentially beneficial gases to soil in the root area of a growing plant, or fumigants prior to planting a specified crop. The presently-preferred example of its use is in drip irrigation where, as shown in FIG. 2, a plant 20 is grown in soil 21 having a surface 22. For some crops, a plastic sheet 23 (regarded as "mulch" for its weed resisting capability) or organic mulch is applied over the surface of the soil near the plant. Water supplied by this system will ordinarily be discharged through a tube according to this invention about 1–20 or more inches below the soil surface.

As shown, a drip irrigation tube 25 extends along a row 26. At intervals its wall is pierced by emitters 60 (FIGS. 1, 2, 3 and 4). An emitter is simply an orifice of some kind through which water will flow from the tubing into the soil region at a regulated rate, under designated system pressure. There is a pressure drop across the emitter from system pressure, usually about 10–20 psig to atmospheric pressure. These emitters are spaced apart along the tube.

The pressure drop at the discharge sites is of considerable importance to this invention. The reason is the higher volume of oxygen and/or other gases that exist at the beginning of the distribution. However, there is more to it than that, because frequently agricultural water supplies are not fully saturated with oxygen. In this invention, super-saturation at system pressure can be assured, so that extra oxygen (or other gas) will be released from solution as the pressure drops, plus additional oxygen (or other gas) as the gas content of the micro-bubbles that are produced when air of other beneficial gas are injected. This water stream is very rich in the gas.

A water source 30, such as a well, a pond, or a water main supplies water to be pressurized by a pump 32 at system pressure. If the source is a main and pressure in the main is adequate, a pump will be unnecessary. The output from the source is provided to a distribution system 33 which includes such conventional valves, regulators, and other controls as may be suitable. The system usually will include a header 34 extending along the heads of the rows 26 of crops. From the header, drip irrigation tubes 25 extend along the rows or to any other desired location where emitters 60 are to be placed. Applications other than in rows is contemplated, for example in groups of emitters around a tree, or a series of trees.

As best shown in FIG. 1, tube 25 is bent back on itself to provide a first length 25a and a second length 25b, joined by a tubular bight 25c so that the stream flows from its upstream end 25d towards downstream end 25e which is normally closed, except when the system is flushed. These lengths are preferably parallel to each other although this is not a limitation on the invention.

A mixer-injector 35 shown schematically in FIG. 1 produces the desired beneficiated water. It receives water from the pump under pressure and passes it to the distribution system. Its well-known function is to inject gas into the throat 35a when it mixes with the water stream.

Although it is possible to provide a single injector supplying gas to water being supplied to the header, it is better practice to provide an injector 35a respective to each tube receiving water from the header and passing water under pressure with injected gas micro-bubbles into the respective tube. When these are used, the single injector 35 will be omitted. Each of the injectors 35a function the same, but only for water in the respective tube. Use of these local injectors eliminates the concern that air might coalesce in the header. It produces a more uniform crop from row to row.

The preferred injector type is a cavitating type whose best example is as shown in FIG. 6. It will increase the oxygen and/or other gases content of water by drawing gas into the stream, and creating micro-bubbles. Many embodiments of mixer-injectors are useful in this invention. However, the increased turbulence and shear in the mixer-injector illustrated in FIG. 6 produces smaller micro-bubbles and distributes them better, thereby providing an improved and more stable mix because of the shear and twist forces exerted by its vanes, resulting in a tumbling flow with reduced rotational forces that would tend to coalesce the gas bubbles. All cavitating mixer-injectors can assure that oxygen and/or other gas saturation can be attained, and that the bubbles will be so small that they will minimally gas-out of the water in the time span generally involved in flow through systems such as these. The specific mixer-injector shown in FIG. 6 provides improved results over the basic shape shown in FIG. 1.

Mixer-injector 35 (FIG. 6) has a body 36 with a flow passage 37 extending from an entry port 38 and an exit port 39. An internal wall 40 forming the flow passage includes, from the entry port in this order, a cylindrical entry portion 41, a constricting portion 42 and injector portion 43, and an expansion portion 42 which terminates at exit port 39.

An injection port 45 enters the injection portion near to the constricting portion. It preferably exists as a circumferential groove 46 in the internal wall, communicating with a passage 47 that receives treatment gas to be provided to the stream in the flow passage, for example from atmospheric air. A metering valve 55 and a check valve 56 (FIG. 1) are placed in passage 47 to provide a unidirectional flow of the correct amount of gas.

It is convenient to regulate the pressure and flow rate by means of establishing a flow and pressure drop through a regulator valve 58 (which may be a flow restrictor instead) in a by-pass passage 59 across the mixer-injector.

Twisting vanes 48 are provided as a group (eight is a useful number) of individual vanes with crests which as they extend along the central axis 50 of the flow passage also extend at an acute angle to a plane passed through them and which includes the central axis. They rise from the entry portion into the constricting portion. They do not intersect the central axis. They give a twist to the outer region of the stream, so that when it crosses the injection port it has an increased turbulence caused by the confluence of the central "core" of the stream (which is not twisted) and the outer portion (which is twisted). Increasing turbulence results in a more efficiency and more thorough mixing of the water and the treatment gas, and the reduction of size of the micro-bubbles, all to the advantage of this process.

Once this is attained, it is advantageous for the spinning component to be reduced so as to reduce the tendency of the micro-bubbles to coalesce under centrifugal forces, while still providing a turbulent tumbling movement. This is accomplished by the group of straightening vanes 49, which extend along the expanding portion. They have crests 51 that are preferably parallel to the central axis, and are spaced apart from it. From exit port 39, the stream enters the distribution system extending to the header or the tubes.

As previously stated, emitters 60 are spaced apart along the length of the tubes. Their characteristic is to provide for a slow bleed of water and micro-bubbles from the tubing into the subsoil. Such emitters are well-known and of several types. They constitute, in effect, a bleed valve that permits a very limited rate of flow of fluid there through, so the pressure in the tubing is not materially reduced, and the contents remain under pressure throughout the system.

A typical useful emitter 60 is shown formed as part of a drip irrigating tube 25. In this emitter, the main passage 62 is formed by a wall 63. Longitudinal edges 64, 65 of the wall are overlapped to leave a restricted channel 66 between overlapped margins 67, 68. A series of inlet ports 69 is formed from passage 62 into channel 66. These ports are small and enter at numerous locations along the overlaps. The channel may further be restricted by internal diverters or by serpentine passages which further reduce the rate of flow of water through channel 66. At one end of channel 66, a slit 71 through the outer overlap releases the water from channel 66 to atmosphere.

There are other types of emitters, including small orifices through the wall of the tubing. Any emitter capable of establishing a regulated rate of fluid flow from passage 62 is acceptable.

Depending on the individual requirements of a given installation, lengths 25a and 25c may be separate pieces of tubing, laid in separate trenches, or apart in a single trench and then covered. They will be generally parallel to one another, and usually will be close enough to one another that the regions of their emission will intersect and to a degree combine. Generally they will be placed quite close to one another.

Their ends remote from the supply will be fluidly connected by bight 25c so that continuous flow can occur through the combined lengths.

It will frequently be more convenient to provide the tubes as a pair of joined companion tubes 70, 71 (FIG. 5). These may be extended or otherwise manufactured with a web 72 joining them, or they may have a common wall as desired. If a web is provided, it can be slit to enable local separation of the tubes to straddle an object or otherwise redirect the discharges. As before, a U-shaped bight tube (not shown) will join the remote ends of the tubes to provide for flow through the combined lengths.

The locations of the emitters along the lengths is arbitrary. Generally it will be provided with known spacings between them. The emitters of the lengths may be axially aligned with one another, or if desired may be staggered, or even differently spaced. When companion tubes are used, it is possible to provide for more restricted emission at upstream regions in the first length than in the downstream regions of the second length, for the purpose of more accurately averaging out the emission of micro-bubbles.

The "return" concept disclosed herein, wherein a stream flow is doubled back on itself has proved to be an effective means to supply water and air quite efficiently over a long row length.

This also results in a reduction of water needed to periodically flush the irrigation line as is customary due to the action of the gas/liquid mixture. For this purpose the distal end of length 25b is opened, such as by a valve or a removable plug.

Because of the nature of the source of water, care is routinely taken in a drip system to filter the water. This disposes of sensibly large particles, and even some moderately sized fines. Still, no practical field system can remove all fine particles ("fines"), so periodically the system will be flushed. Every time the system is flushed, water is wasted. It is, however, necessary in order to keep the tubes open.

Settlement occurs faster when the flow rate is slower. If the fines did not settle out, most of them could merely pass through the emitters. This invention improves the situation by speeding up the flow with more turbulence, thereby reducing the tendency for fines to settle and increase the chance that they will pass through an emitter. Less flushing is then needed.

The vanes in the mixer-injector shown in FIG. 6 improve the function of the system, but are not necessary. FIG. 1 schematically illustrates a mixer-injector of the same type without them, and will still provide supplying a stream useful with this invention.

While it is useful to provide a single large mixer-injector supplying a header, generally it will be preferable to provide an individual mixer-injector immediately ahead of each tube. Small injectors for such an application are available from Mazzei Injector Corporation of Bakersfield, Calif. The use of mixer-injectors downstream from the header eliminates coalescence of bubbles in the header, because they are not formed in the header.

The provision of the tubes in associated lengths as shown significantly reduces differences in irrigation, and provides a system with less need for flushing.

This invention is not to be limited by the embodiments shown in the drawings and described in the description, which are given by way of example and not of limitation, but only in accordance with the scope of the appended claims.

I claim:

1. A system to provide subsurface irrigation for growing crops, plants, trees, and landscaping, comprising;
    a header adapted to receive and contain water under pressure;
    a plurality of supply ports from said header;
    a tube having a first length with an inlet end connected to a respective one of said supply ports and an outlet end spaced from said inlet end, a second length with an inlet end and a second end, the second end of the second length being closed during irrigation operation, and opened during a flushing operation, a tubular bight joining the outlet end of the first length to the inlet end of the second length, each length having along its linear extent a plurality of emitters to pass fluid from inside the tube to the outside of the tube;

said first and second lengths being substantially linearly aligned with and joined over at least a portion of their linear extent, substantially to maintain said linear alignment, said emitters being so disposed and arranged that the distance between emitters on one length and nearby emitters on the other length are known, and a cavitating mixer injector injecting gas into said water upstream from said tubes whereby to provide said gas in the form of micro-bubbles in the water supplied to the tube.

2. A system according to claim 1 in which a plurality of said tubes is included, each of which is connected to a respective one of said supply ports.

3. A system according to claim 2 in which one of said mixer-injectors is connected to each outlet port upstream of its respective tube and downstream from said header.

4. A system according to claim 2 in which said first and second lengths can be locally separated at locations along their length.

5. A system according to claim 1 in which said mixer-injector discharges into said header.

6. A system according to claim 1 in which said mixer-injector includes twisting and straightening vanes.

7. A system according to claim 1 in which said gas is air.

8. A system according to claim 1 in which said gas is selected from the group consisting of air, oxygen, carbon dioxide, ozone, fumigants, and combinations thereof.

9. A Method of flushing the apparatus of claim 1 comprising opening said second end of second length and flushing the system with a stream of water containing micro-bubbles of gas provided by said mixer-injector.

10. The method of claim 9 in which said gas is air.

11. A system according to claim 1 in which said lengths are continuously joined over the major portion of their linear extent.

12. A system according to claim 1 in which said emitters are uniformly spaced along both of said lengths.

13. A tube for subsurface irrigation comprising:
a first and a second length of tube, said lengths being substantially linearly aligned with one another, each said length having emitters spaced along its linear extent, said emitters being so disposed and arranged that the distance between emitters on one length and nearby emitters on the other length are known, and a tubular bight joining adjacent ends of said lengths whereby to provide a fluid passage through said first length through said bight and into said second length, the end of said second length farthest from said bight being able to be closed to flow during irrigation operation and opened during flushing operation, said lengths being joined over at least a portion of their linear extent to substantially maintain said linear alignment.

14. A tube according to claim 13 in which said lengths are joined by an intermediate joinder that enables local separation of said lengths.

15. Apparatus according to claim 13 in which said lengths are continuously joined over the major portion of their linear extent.

16. A system according to claim 13 in which said emitters are uniformly spaced along both of said lengths.

17. In a subsurface irrigation system in which water containing micro-bubbles of gas which were injected by a cavitating mixer-injector is injected into a linearly-extending tube, and from said tube injected for distribution into subsurface soil, the improvement comprising;
a first length of said tube and a second length of said tube, said lengths being joined at a respective end by a tubular bight, said lengths extending substantially linearly aligned with one another, with the end of the second length removed from the bight being closed to flow during distribution operation and opened during flushing operation, said lengths being initially joined over at least a portion of their linear extent to substantially maintain linear alignment, each said length having emitters spaced along its linear extent, said emitters being so disposed and arranged that the distance between emitters on one length and nearby emitters on the other length are known.

18. Apparatus according to claim 17 in which said lengths are continuously joined over the major portion of their linear extent.

19. A system according to claim 17 in which said emitters are uniformly spaced along both of said lengths.

20. A method of subsurface irrigation comprising operating the apparatus of claim 17 to provide said water and micro-bubbles of gas to said subsurface soil for irrigation operation with said end of said second length removed from said bight closed to flow.

21. A method of subsurface irrigation comprising operating the apparatus of claim 17 to provide said water and micro-bubbles of gas to said tube for flushing operation with said second end of said second length opened to flow.

* * * * *